F. W. SCHWINN.
UNIVERSAL JOINT.
APPLICATION FILED JAN. 12, 1917.

1,243,347.

Patented Oct. 16, 1917.

Witnesses:

Inventor:
Frank W. Schwinn,
By Dyrenforth, Lee, Chritton & Wiles
Attys

UNITED STATES PATENT OFFICE.

FRANK W. SCHWINN, OF CHICAGO, ILLINOIS.

UNIVERSAL JOINT.

1,243,347.  Specification of Letters Patent.  Patented Oct. 16, 1917.

Application filed January 12, 1917. Serial No. 142,053.

*To all whom it may concern:*

Be it known that I, FRANK W. SCHWINN, a citizen of the United States, residing at Chicago, in the county of Cook and State of Illinois, have invented a new and useful Universal Joint, of which the following is a specification.

My invention relates to universal joints, designed for connecting a driving and driven shaft, the axes of which intersect but are out of alinement. The invention will be fully understood from the following detailed description taken in connection with the accompanying drawings, in which—

Figure 1:
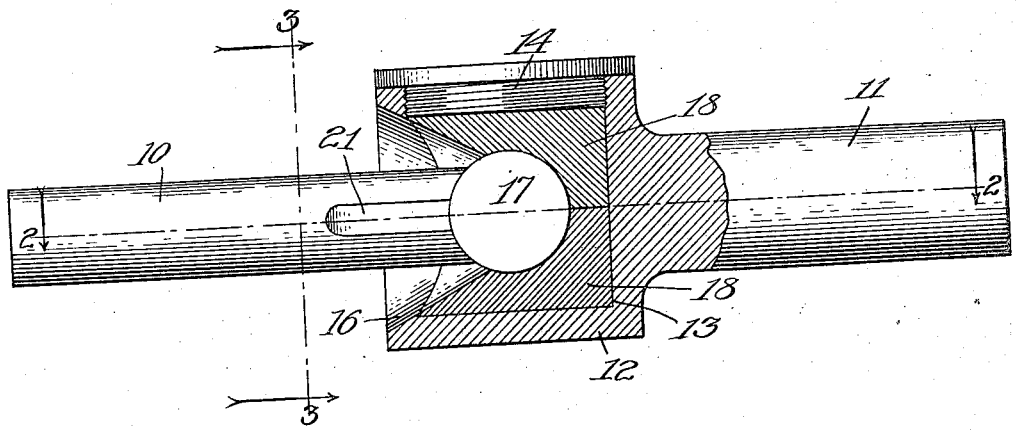
Figure 2:
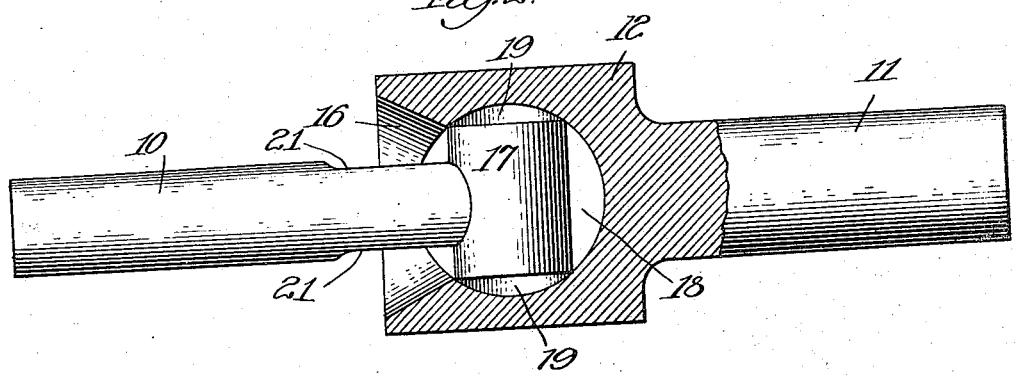
Figure 3:
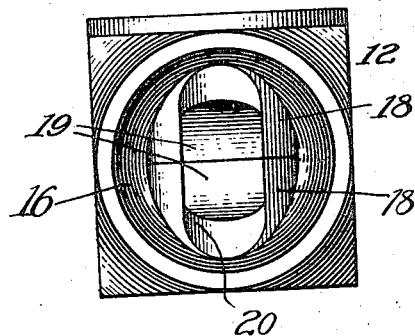
Figure 4:
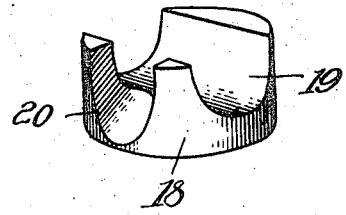

Figure 1 is a side elevation of one form of construction embodying the invention, certain portions of the joint being shown in section; Fig. 2 is a top plan view, parts being shown in section on the line 2, 2 of Fig. 1; Fig. 3 is an end view of the driven member of the joint, as represented by the line 3, 3 of Fig. 1; and Fig. 4 is a perspective view of one of the bearing members.

Referring more particularly to the drawing, the numeral 10 designates the driving shaft, and the numeral 11 the driven shaft. One of these members, (in the illustration chosen the driven shaft being the member) carries at its end an enlarged head 12, the outer conformation of which is that of a cube with rounded corners. It is preferred that the head 12 be formed integrally with the shaft member which carries it. Extending inwardly from one of the side faces of the cube is a cylindrical bore 13, which stops short of the opposite face and is adapted to be closed at its open end as by a screw-plug 14, having a flanged head 15 which abuts the face of the cube. An outwardly flaring or conical aperture 16 is formed in the wall of the head 12 opposite the stem or shaft 11, this flaring aperture intersecting the inner bore 13.

The driving shaft member 10 has a T-head 17, which, for the purpose of giving an increased bearing surface, is preferably of enlarged diameter. In the preferred embodiment of the invention the head 17 is of such size that the rectangle formed by its projection shall be just circumscribed by the circumference of the bore 13, as is clearly shown in Fig. 2. The head member 17 is carried within the bore 13 by a compound bearing member comprising symmetrical upper and lower sections 18 of the contour illustrated in Fig. 4. When assembled in operative position the sections 18 form a cylinder nicely fitting the cylindrical bore 13 and bearing at the bottom against the closed end of this bore and at the top against the inner end of the plug 14, as shown in Fig. 1. To receive the T-head 17 the complementary bearing blocks 18 are provided with opposed semi-cylindrical bearing surfaces 19, which together constitute an internal bore, the axis of which intersects the axis of the cylindrical bore 13 and of the shaft 11, and is at right angles to both of these. To receive the driving shaft 10 the bearing members 18 are provided with complementary notches 20, the width of which is equal to the diameter of the shaft 10 and the length of which is determined by the proportions of the flaring aperture 16 in the head 12. As is shown in Fig. 1, the notches 20 preferably have their end walls flared at an angle equal to the flare of the aperture 16. In order that the shaft 10 may present a surface contact instead of a line contact to the side walls of the notches 20, the shaft is preferably flattened, as at 21, the distance between these flattened surfaces being equal to the width of the complementary notches 20.

To assemble the joint, the parts being in the proportions shown in the drawings, the bottom bearing section 18 as shown in Fig. 1, will first be put in place in the bore 13, and the top bearing section 18 and plug 14 being at that time removed, the shaft 10 will be introduced through the upper, open end of the bore 13 and passed outwardly through the flaring aperture 16. The T-head 17 of the shaft 10 will in this manner be brought into position, resting in the semi-cylindrical bearing surface 19, the stem or shaft 10 resting in the notch 20. The upper bearing section 18 may now be introduced through the upper, open end of the bore 13 and the screw-plug 14 screwed down until its flange 15 abuts the face of the head 12. The parts having been properly proportioned, the bearing members 18 will constitute in effect a single vertical, cylindrical trunnion, capable of being rocked within the bore 13, while the head 17 will constitute a horizontal trunnion capable of being rocked within the cylindrical bearing formed by the complementary semi-cylindrical surfaces 19. Axial movement of the T-head 17 will be prevented by the engagement of the flattened surfaces 21 with the sides of the notches 20, and axial movement of the bearing sections 18 will be prevented by the closed bottom and plugged end of the bore 13. The parts, therefore, constitute a kinematically perfect Hooke's joint, or universal joint, connecting the intersecting but non-alining shafts 10 and 11, and capable of transmitting motion of rotation from one to the other when their angles do not vary beyond the extent permitted by the flaring aperture 16 and by the length of the notches 20.

Although the various bearing parts of my universal joint, as above described, are mere surface bearings formed by the surfaces of the structural elements themselves, it will be understood that any of the expedients now employed for reducing the friction of sliding and rotating contacts may be incorporated in my joint without changing the essential character of the joint.

While I have shown and described in considerable detail one specific embodiment of my invention, it should be understood that this is illustrative only and for the purpose of making the invention more clear, and that I do not regard the invention as limited to these details, nor to any of them, except in so far as such limitations are included within the terms of the accompanying claims, in which it is my intention to claim all novelty inherent in my invention as broadly as is permissible in view of the prior art.

What I regard as new and desire to secure by Letters Patent is:

A universal joint comprising in combination a driving shaft, a driven shaft, a head carried by one of said members and having a cylindrical bore at right angles to its axis, a pair of cylindrical blocks mounted end to end in the said bore and rotatable therein, means closing the ends of the said bore and forming bearing surfaces for the outer ends of the said blocks, the abutting inner ends of said blocks being provided with transversely extending complementary cylindrical grooves, and longitudinally extending complementary notches intersecting the said grooves, and a T-head of cylindrical cross-section carried by the other of said members and oscillatably mounted between the said grooves, the said last-named member extending outwardly through the said notches and having flattened surfaces engaging the lateral walls thereof.

FRANK W. SCHWINN.